United States Patent
Larsson et al.

(10) Patent No.: US 7,273,041 B2
(45) Date of Patent: Sep. 25, 2007

(54) FUEL SYSTEM COMBINATION VALVE FOR AN INTERNAL COMBUSTION ENGINE AND SUCH A FUEL SYSTEM

(75) Inventors: Anders Larsson, Lerum (SE); Lars Teglund, Svancsund (SE); Peter Davidsson, Kungsbacka (SE)

(73) Assignee: Volvo LastVagnar AB, Gothenburg (SE)

( * ) Notice: Subject to any disclaimer, the term of this patent is extended or adjusted under 35 U.S.C. 154(b) by 0 days.

(21) Appl. No.: 10/709,063

(22) Filed: Apr. 9, 2004

(65) Prior Publication Data

US 2004/0261772 A1    Dec. 30, 2004

Related U.S. Application Data

(63) Continuation of application No. PCT/SE02/01776, filed on Sep. 30, 2002.

(30) Foreign Application Priority Data

Oct. 10, 2001    (SE) .................................... 0103387

(51) Int. Cl.
*F02M 37/04*    (2006.01)
(52) U.S. Cl. ........................ 123/516; 123/514
(58) Field of Classification Search ................ 123/518, 123/516, 520, 521, 514, 519; 137/173, 512 R, 137/513.5, 512.2
See application file for complete search history.

(56) References Cited

U.S. PATENT DOCUMENTS 3,856,041 A * 12/1974 Cryder et al. ............ 137/493.6
4,217,927 A *  8/1980 Morita .................... 137/493.3
4,328,827 A *  5/1982 Enjolras ................... 137/512.2
4,370,102 A *  1/1983 Sasaki et al. ............... 417/296
4,539,959 A *  9/1985 Williams ..................... 123/456
4,625,701 A * 12/1986 Bartlett et al. .............. 123/514
4,637,351 A *  1/1987 Pakula ....................... 123/25 J
4,831,991 A *  5/1989 Cayot ......................... 123/516

(Continued)

FOREIGN PATENT DOCUMENTS

DE         4014551 C1    12/1991

(Continued)

*Primary Examiner*—Carl S. Miller
(74) *Attorney, Agent, or Firm*—Novak Druce & Quigg, LLP

(57) ABSTRACT

The invention relates to a combination valve (15) for pressure control and venting in a fuel system for delivering fuel to an internal combustion engine. The valve comprises a primary valve cone (25), which is supported so that it is displaceable between two limit positions in a cylinder bore (24) in a valve housing (23), against the action of a first spring element (26). The displacement of the valve cone from an inoperative limit position into an operative limit position leads to the opening of a connection between an inlet duct (32) and an outlet duct (33) in the valve housing. The valve cone (25) is provided with an inner passage (27), which is designed to accommodate a secondary valve cone (28). This is displaceable between a support surface (29) and a valve seat (30) against the action of a second spring element (31) having a lower spring constant than the first spring element. A displacement of the secondary valve cone against the action of the second spring element (31) leads to the opening of a connection between the inlet duct (32) and a venting duct (34).

8 Claims, 2 Drawing Sheets

U.S. PATENT DOCUMENTS

| | | | |
|---|---|---|---|
| 5,038,724 A * | 8/1991 | Neal et al. | 123/41.08 |
| 5,095,939 A * | 3/1992 | Alderfer et al. | 137/512.1 |
| 5,443,049 A * | 8/1995 | Wall | 123/458 |
| 5,534,161 A | 7/1996 | Tarr et al. | |
| 6,446,613 B1 * | 9/2002 | Djordjevic | 123/514 |
| 6,481,592 B2 * | 11/2002 | Harris | 220/203.24 |

FOREIGN PATENT DOCUMENTS

| | | |
|---|---|---|
| EP | 0307739 A2 | 3/1989 |
| EP | 0964153 A2 | 12/1999 |

* cited by examiner

FUEL SYSTEM COMBINATION VALVE FOR AN INTERNAL COMBUSTION ENGINE AND SUCH A FUEL SYSTEM

CROSS REFERENCE TO RELATED APPLICATIONS

The present application is a continuation patent application of International Application No. PCT/SE02/01776 filed 30 Sep. 2002 which was published in English pursuant to Article 21(2) of the Patent Cooperation Treaty, and which claims priority to Swedish Application No. 0103387-7 filed 10 Oct. 2001. Both applications are expressly incorporated herein by reference in their entireties.

BACKGROUND OF INVENTION

1. Technical Field

The present invention relates to a combination valve for pressure control and venting in a fuel system for delivering fuel to an internal combustion engine, comprising a primary valve cone, which is supported so that it is displaceable between two limit positions in a cylinder bore in a valve housing, against the action of a spring element, the displacement of the valve cone from an inoperative limit position into an operative limit position leading to the opening of a connection between an inlet duct and an outlet duct in the valve housing. The invention also relates to a fuel system for use of the combination valve.

2. Background

Fuel systems for diesel engines use relatively high working pressures. If air gets into the fuel system on the high-pressure side, it is not possible to maintain the required working pressure. Engine operating problems can also arise if the fuel has a high water content. Fuel systems for diesel engines are usually provided with venting screw and hand pump, which can be used to vent air and drain water from the fuel system. The method of removing air or water by means of venting screw and hand pump is time-consuming and awkward.

Fuel systems exist which have arrangements for automating the process of removing air or water, as disclosed, for example, by U.S. Pat. No. 5,534,161. This patent describes a pump which can be driven in two directions by means of a microprocessor for use in removing water from a fuel system. However, this arrangement only facilitates the process of venting air from the fuel system, and further measures are required in order to remove air from the high-pressure side of the system. This arrangement means, therefore, that the number of fuel system components is increased without entirely solving the problem by facilitating the process of venting air.

SUMMARY OF INVENTION

An object of the invention is therefore to provide a fuel system which permits the automatic removal of air and water without the system becoming complicated and expensive.

To achieve this object, the combination valve according to the invention is characterized in that the valve cone is provided with an inner passage, which is designed to accommodate a secondary valve cone, which is displaceable between a support surface and a valve seat against the action of a second spring element having a lower spring constant than the first spring element, displacement of the secondary valve cone against the action of the second spring element leading to the opening of a connection between the inlet duct and a venting duct. By means of this combination valve design the number of components in the fuel system can be limited.

The fuel system according to the invention is characterized in that the combination valve is located in a vertically elevated position. This permits the efficient removal of air from the fuel system.

BRIEF DESCRIPTION OF DRAWINGS

The invention will be described in more detail below with reference to exemplary embodiments which are shown in the drawings attached, in which.

DETAILED DESCRIPTION

Figure 1:
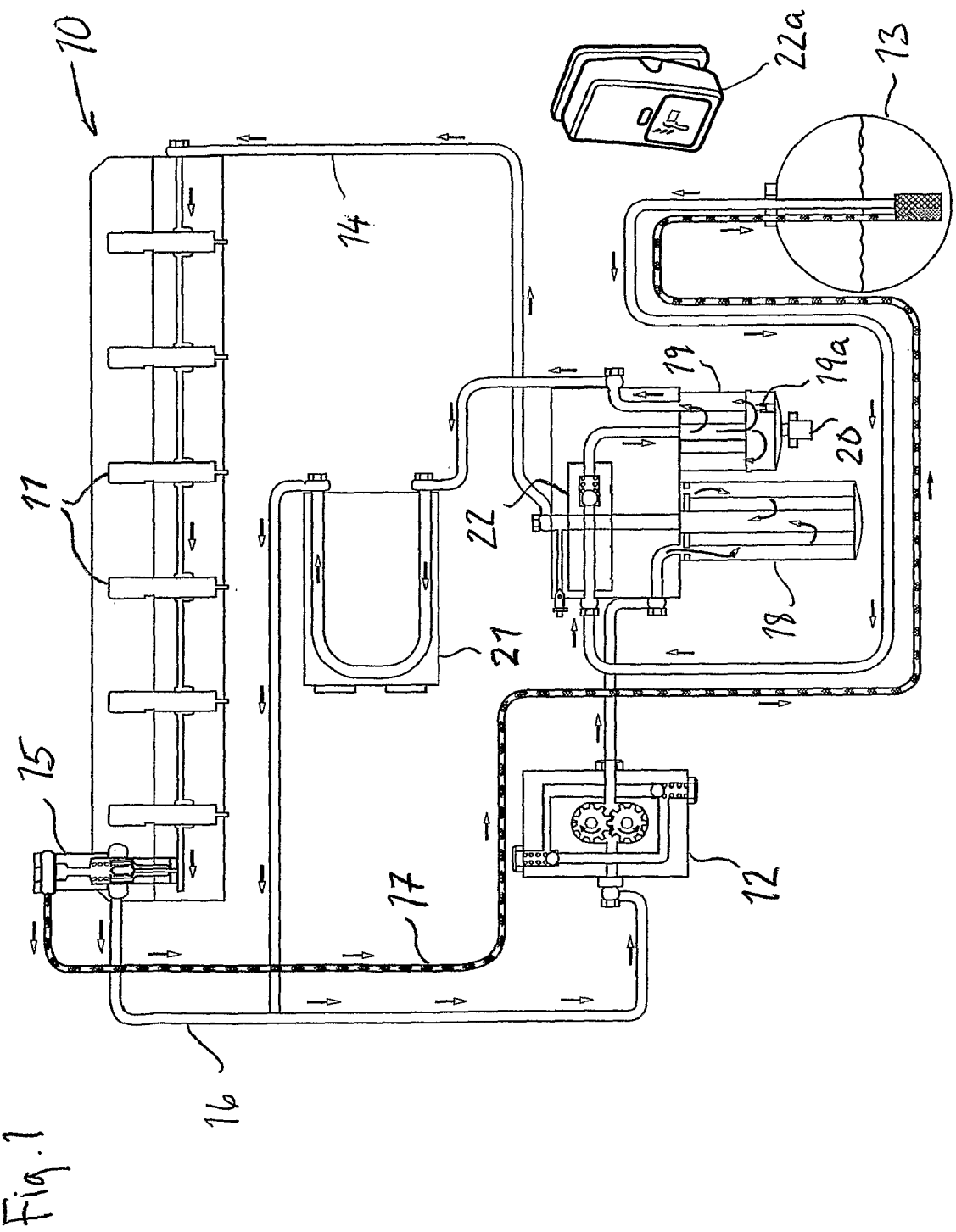
FIG. 1 shows a diagram of an internal combustion engine having a fuel system according to the invention.

The internal combustion engine 10 shown in diagrammatic form in FIG. 1 is a 6-cylinder diesel engine having a corresponding number of injectors 11. This engine may be used, for example, to power a heavy truck.

Diesel fuel is fed by a pump 12, driven by the engine, from a tank 13 to the injectors 11 via a common feed line 14. A combination valve 15 for pressure control and venting is fitted downstream of the injectors 11, with the connecting line from the injectors directed upwards, in such a way that the valve is situated vertically above this inlet. A return line 16 for unused fuel is connected to the combination valve at a point above the connecting line from the injectors. A venting line 17 is also connected to the combination valve at a point above the return line 16, this venting line being connected to the fuel tank 13.

In addition, the fuel system comprises main fuel filter 18 and coarse filter together with water separator 19 with drain valve 20 and a cooler 21. An electrically powered secondary pump 22 is located close to the main fuel filter 18 and the water separator 19, which is equipped with a sensor 19a for detecting a certain water level in the water separator. The drain valve 20 is electrically operatable.

Venting of the fuel system must normally be carried out after changing the filter or following other work that results in air getting into the system. Otherwise any attempt to start the engine will fail. The secondary pump 22 is therefore started, preferably by pressing a button 22a on the instrument panel, and the pump 22 is driven for a preprogrammed length of time, which is sufficient to expel all air via the combination valve 15. Fuel is then pumped from the tank 13 to one side via the feed line 14 and to the other side via the return line 16 up to the combination valve. The engine 10 can then be started. The air can thus be removed from the fuel system merely at the press of a button.

If the sensor 19a in the water separator 19 indicates the presence of water, a pilot lamp on the instrument panel can be lit in order to alert the driver of the vehicle that problems may occur if the water is not removed from the water separator. The driver can then press the same button 22a as was used for venting air, preferably when the engine is shut off, but the electrically powered secondary pump 22 needs to be operated only for a shorter period of time, whilst the electrically operated drain valve is opened. The water is thereby expelled from the water separator 19 into a collecting vessel (not shown) by fuel which is drawn in from the tank 13 by the pump 22. The length of time is suitably set so that no fuel is allowed to pass through the drain valve.

Once this period of time has elapsed, the secondary pump 22 and the drain valve 20 are shut off.

Figure 3:
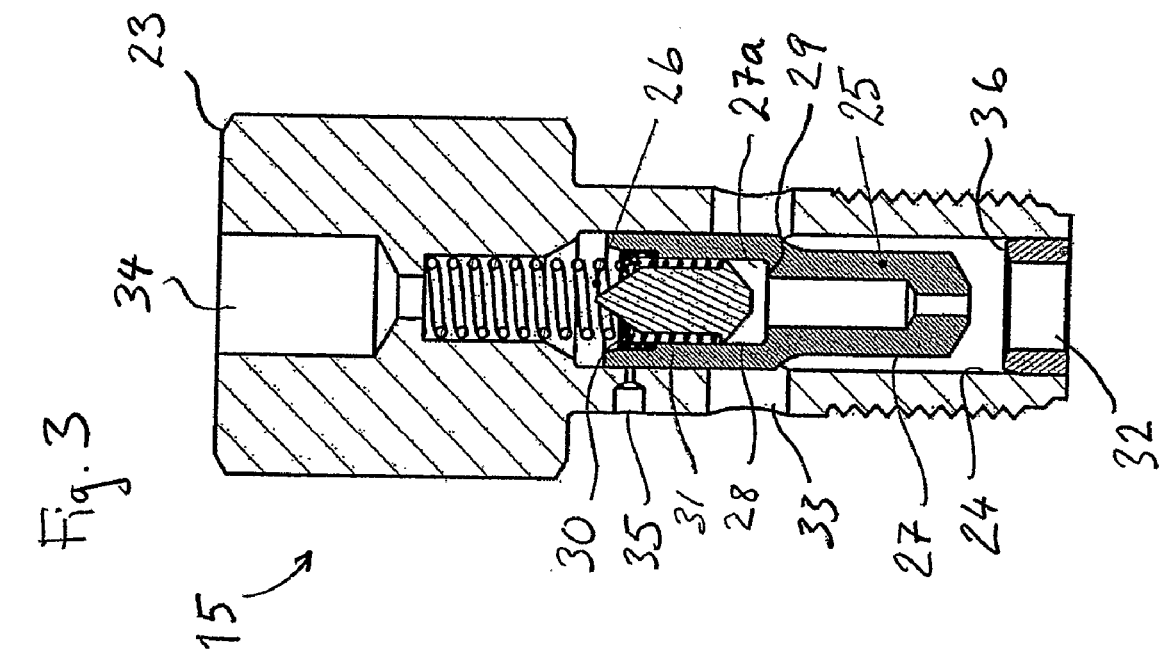
Figure 2:
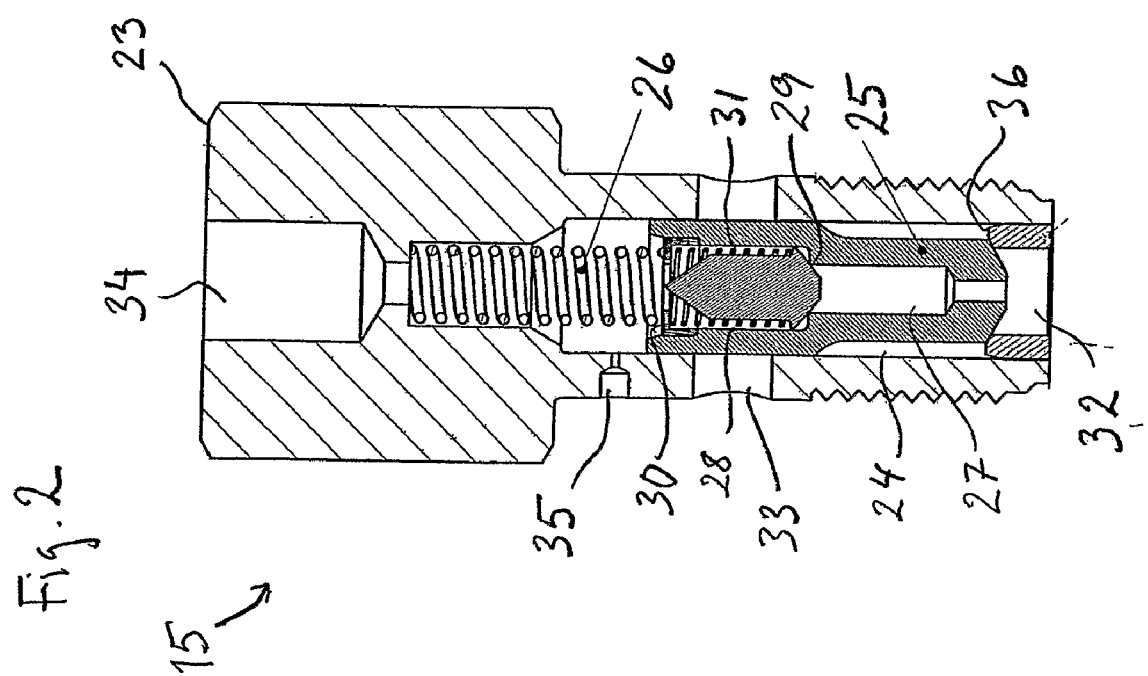
FIG. 2 is a longitudinal section through a combination valve according to the invention which forms part of the fuel system, in an inoperative position, and FIG. 3 correspondingly shows the combination valve according to FIG. 2 in an operative position.

The combination valve 15 is shown in more detail in two different operating positions in FIGS. 2 and 3. The valve comprises a valve housing 23 having a cylinder bore 24, which accommodates a primary valve cone 25. The cone 25 is supported so that it is displaceable in the cylinder bore between two limit positions against the action of a first spring element 26, which in this exemplary embodiment consists of a helical compression spring. The primary valve cone 25 forms a cylindrical piston having an axial through-passage 27, which in a widened section 27a accommodates a secondary valve cone 28. This is displaceable between a support surface 29 and a valve seat 30, against the action of a second spring element 31, which in this exemplary embodiment consists of a helical compression spring having a lower spring constant than the first spring element 26.

The valve housing 23 has an inlet at 32, fuel outlet 33 to the return line 16 and air outlet at 34. In addition there is a small passage 35 to the return line 16.

The combination valve 15 primarily functions as a pressure control valve. A displacement of the primary valve cone 25 from the inoperative position shown in FIG. 2 to the operative position shown in FIG. 3 means that the primary valve cone 25 is removed from the seat 36 and leads to opening of a connection between the inlet 32 and the fuel outlet 33. This corresponds to the normal operating position of the valve with the first spring element 26 compressed. This reduces the fluid pressure downstream of the combination valve, that is to say on the suction side of the primary fuel pump 12. The secondary valve cone 28 is now in contact with the valve seat 30. Any small air bubbles that might occur in the fuel system even after a venting process can pass the cone 28 to the venting outlet via an axial groove in the seat 30. The groove is designed so that it normally allows only a very small fuel flow to pass.

In addition the valve functions as a venting valve. If air is present in the fuel system, the secondary pump 22 is activated, as has been described above. The fuel system is thereby slowly refilled from the tank 13, at the same time that air is evacuated from the system via the combination valve 15. The secondary cone 28 is then lifted from the support surface 29 (see FIG. 2) by the air pressure and the air can pass out via the venting outlet. At the same time air can be vented from the low-pressure side of the fuel system via the return line 16 and the passage 35. The primary valve cone 25 is formed so that the passage 35 is closed before the fuel outlet 33 is opened. Automatic venting of the fuel system therefore occurs both in normal operation and in the case of forced venting.

The invention must not be seen as being limited to the exemplary embodiment described above, a number of further variants and modifications being feasible within the scope of the patent claims below.

The invention claimed is:

1. A combination valve (15) for pressure control and venting in a fuel system for delivering fuel to an internal combustion engine, comprising a primary valve cone (25), which is supported so that it is displaceable between two limit positions in a cylinder bore (24) in a valve housing (23), against the action of a first spring element (26), the displacement of the valve cone from an inoperative limit position into an operative limit position leading to the opening of a connection between an inlet duct (32) and an outlet duct (33) in the valve housing, wherein the valve cone (25) is provided with an inner passage (27), which is designed to accommodate a secondary valve cone (28), which is displaceable between a support surface (29) and a valve seat (30) against the action of a second spring element (31) having a lower spring constant than the first spring element, displacement of the secondary valve cone against the action of the second spring element (31) leading to the opening of a connection between the inlet duct (32) and a venting duct (34), wherein the secondary valve cone (28) interacts with the valve seat (30) in such a way that a comparatively small partial flow can pass the valve cone when resting against the seat.

2. A combination valve (15) for pressure control and venting in a fuel system for delivering fuel to an internal combustion engine, comprising a primary valve cone (25), which is supported so that it is displaceable between two limit positions in a cylinder bore (24) in a valve housing (23), against the action of a first spring element (26), the displacement of the valve cone from an inoperative limit position into an operative limit position leading to the opening of a connection between an inlet duct (32) and an outlet duct (33) in the valve housing, wherein the valve cone (25) is provided with an inner passage (27), which is designed to accommodate a secondary valve cone (28), which is displaceable between a support surface (29) and a valve seat (30) against the action of a second spring element (31) having a lower spring constant than the first spring element, displacement of the secondary valve cone against the action of the second spring element (31) leading to the opening of a connection between the inlet duct (32) and a venting duct (34), wherein the valve housing (23) is provided with a lateral duct (35) to the cylinder bore (24), the lateral duct being designed to be connected to a return line (16) arranged in the fuel system, and being closed by the primary cone (25) when this is displaced against the action of the first spring element (26).

3. A fuel system for delivering fuel to an internal combustion engine, that uses a combination valve (15) for pressure control and venting, the fuel system comprising a primary fuel pump (12) for normal pressurization of the fuel system and a secondary fuel pump (22) for venting, the combination valve (15) comprising a primary valve cone (25), which is supported so that it is displaceable between two limit positions in a cylinder bore (24) in a valve housing (23), against the action of a first spring element (26), the displacement of the valve cone from an inoperative limit position into an operative limit position leading to the opening of a connection between an inlet duct (32) and an outlet duct (33) in the valve housing, wherein the valve cone (25) is provided with an inner passage (27), which is designed to accommodate a secondary valve cone (28), which is displaceable between a support surface (29) and a valve seat (30) against the action of a second spring element (31) having a lower spring constant than the first spring element, displacement of the secondary valve cone against the action of the second spring element (31) leading to the opening of a connection between the inlet duct (32) and a venting duct (34), wherein the secondary valve cone (28) interacts with the valve seat (30) in such a way that a comparatively small partial flow can pass the valve cone when resting against the seat.

4. The combination valve as claimed in claim 1, wherein the seat (30) is provided with an axial groove which determines the size of the partial flow.

5. The combination valve as claimed in claim 2, wherein the lateral duct (35) is closed by the primary cone (25) during displacement of the primary cone from an inoperative position to an operative position, before the connection between the inlet duct (32) and the outlet duct (33) is opened.

6. A fuel system for the use of a combination valve according to claim 3 in a fuel system for a vehicle, wherein the valve (15) is located in a vertically elevated position in the fuel system.

7. The fuel system as claimed in claim 3, wherein a water separator (19) having a sensor (19a) for detecting the presence of water in the fuel and an electrically operatable drain valve (20).

8. The fuel system as claimed in claim 3, wherein the secondary fuel pump (22) is connected to a microprocessor, which permits activation of the said pump for a preprogrammed length of time which is sufficient to expel any air occurring in the fuel system through the combination valve (15), or to remove water from the water separator (19).

* * * * *